(12) United States Patent
Delaigue et al.

(10) Patent No.: US 9,362,702 B2
(45) Date of Patent: Jun. 7, 2016

(54) SYSTEM AND METHOD FOR THE OPTICAL AMPLIFICATION OF ULTRASHORT LIGHT PULSES BEYOND THE LIMIT OF THE SPECTRAL GAIN BAND

(71) Applicants: Martin Delaigue, Bordeaux (FR); Clemens Honninger, Cestas (FR); Eric Mottay, Begles (FR)

(72) Inventors: Martin Delaigue, Bordeaux (FR); Clemens Honninger, Cestas (FR); Eric Mottay, Begles (FR)

(73) Assignee: AMPLITUDE SYSTÈMES, Pessac (FR)

( * ) Notice: Subject to any disclaimer, the term of this patent is extended or adjusted under 35 U.S.C. 154(b) by 0 days.

(21) Appl. No.: 14/391,823

(22) PCT Filed: Apr. 12, 2013

(86) PCT No.: PCT/FR2013/050807
§ 371 (c)(1),
(2) Date: Oct. 10, 2014

(87) PCT Pub. No.: WO2013/153344
PCT Pub. Date: Oct. 17, 2013

(65) Prior Publication Data
US 2015/0325972 A1    Nov. 12, 2015

(30) Foreign Application Priority Data

Apr. 12, 2012    (FR) ...................................... 12 53390

(51) Int. Cl.
*H01S 3/11* (2006.01)
*H01S 3/23* (2006.01)

(Continued)

(52) U.S. Cl.
CPC ................. *H01S 3/0057* (2013.01); *H01S 3/11* (2013.01); *H01S 3/2308* (2013.01); *H01S 3/1618* (2013.01); *H01S 2301/08* (2013.01)

(58) Field of Classification Search
CPC .... H01S 3/0057; H01S 3/1618; H01S 5/5054
See application file for complete search history.

(56) References Cited

U.S. PATENT DOCUMENTS

2004/0190119 A1    9/2004    Tauser et al.
2004/0240037 A1    12/2004   Harter et al.

(Continued)

FOREIGN PATENT DOCUMENTS

EP    2 086 074 A2    8/2009
WO    03/096495 A1    11/2003

(Continued)

OTHER PUBLICATIONS

International Search Report, dated Aug. 1, 2013, from corresponding PCT application.

*Primary Examiner* — Eric Bolda
(74) *Attorney, Agent, or Firm* — Young & Thompson (57) ABSTRACT

A system for the optical amplification of high-energy ultrashort light pulses, includes: an oscillator that can emit light pulses of sub-picosecond duration $\tau_0$, a pre-compensator, and a solid optical amplifier that can amplify the chirped light pulses. The pre-compensator has a negative group velocity dispersion, the pre-compensator being capable of generating negatively chirped light pulses, and the optical amplifier has a positive group velocity dispersion, the optical amplifier being disposed such as to receive and amplify the negatively chirped light pulses. The optical amplifier is configured such that the light pulses can induce a broadening of the spectral gain band $\Delta\nu$ by self-phase modulation, such as to generate amplified, time-compressed light pulses of duration $\tau_3$, which is shorter than the duration $\tau=1/\Delta\nu$ of the bandwidth limitation of the optical amplifier.

12 Claims, 4 Drawing Sheets

(51) Int. Cl.
  *H01S 3/16*  (2006.01)
  *H01S 3/00*  (2006.01)

(56) References Cited

U.S. PATENT DOCUMENTS

| 2004/0263950 A1* | 12/2004 | Fermann | H01S 3/0057 |
| | | | 359/333 |
| 2011/0002691 A1* | 1/2011 | Lin | H01S 3/10023 |
| | | | 398/118 |
| 2012/0120971 A1* | 5/2012 | Harter | H01S 3/0092 |
| | | | 372/18 |
| 2013/0083814 A1* | 4/2013 | Nodop | H01S 3/0057 |
| | | | 372/10 |
| 2013/0293941 A1* | 11/2013 | Harter | H01S 3/0092 |
| | | | 359/238 |

FOREIGN PATENT DOCUMENTS

| WO | 2005/041367 A1 | 5/2005 |
| WO | 2007/142843 A2 | 12/2007 |

* cited by examiner

SYSTEM AND METHOD FOR THE OPTICAL AMPLIFICATION OF ULTRASHORT LIGHT PULSES BEYOND THE LIMIT OF THE SPECTRAL GAIN BAND

The present invention relates to a system and a method for optical amplification of ultrashort light pulses. More precisely, the invention proposes a system and a method for optical amplification of ultrashort light pulses beyond the limit of the spectral gain band.

The ultrashort (sub-picosecond) and high-energy (several hundreds of microjoules) light pulse lasers are used today in many industrial applications such as micro-machining, laser marking, ophthalmology, nanosurgery, and in scientific applications for the investigation of fast physical, chemical or biological phenomena. In the last years, great progresses have been made in the reduction of the duration and/or the increase of the energy of the ultrashort light pulses at high repetition frequencies.

The femtosecond laser amplifiers are typically based on either a linear architecture (bar amplifiers, thin-disk amplifiers, plate (or slab) amplifiers or amplifying optical fibers) or a multi-pass architecture, for example for the regenerative amplifiers. However, the amplification of sub-picosecond light pulses in a solid amplifying medium leads to a broadening of the duration of the initial pulses due to the Group Velocity Dispersion (GVD) of the amplifier. In the present document, it is meant by "dispersion" the Group Velocity Dispersion (GVD) of a component or a material. Such dispersion is quantified by a coefficient of dispersion of the second order $\beta_2$ whose value depends on the type of optical component (optical-fiber stretcher, micro-structured optical fiber, optical fiber Bragg-grating, diffraction-grating compressor, dielectric mirror, solid-state optical amplifier . . . ) and on the number of passages of the light pulses through or on the related optical component. The dispersion is also equivalently called a "chirp".

Most of the sub-picosecond laser amplifiers apply the method of chirped pulse amplification (CPA) so as to avoid overcurrent peaks liable to damage the optical components or to produce undesirable non-linear effects (D. Strickland, G. Mourou, "Compression of amplified chirped optical pulses", Opt. Commun. 56, 219, 1985). The chirped pulse amplification technique is based on the application of a normal or positive dispersion (GVD>0) to time stretch (by a factor ×1000 or more) the light pulses before their amplification, and on the linear-regime amplification of the stretched pulses, and finally on the application of an abnormal or negative dispersion (GVD<0) after amplification, so as to time-compress the amplified light pulses to a minimum pulse duration.

Figure 1:
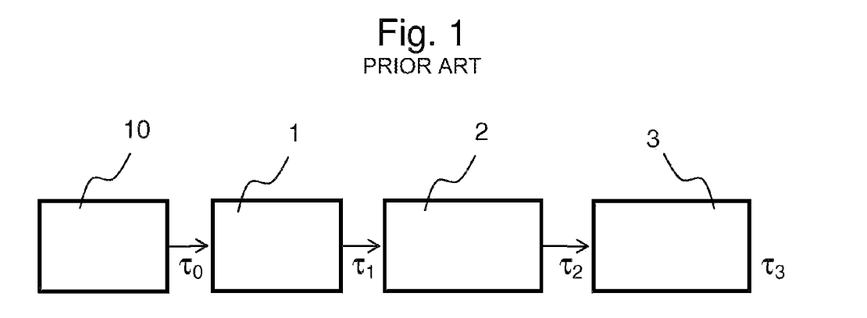
FIG. 1 schematically shows a chirped pulse laser amplifier according to the prior art.

By way of example, FIG. 1 shows a femtosecond chirped pulse amplification laser according to the prior art. An oscillator 10 generates low-power light pulses of initial femtosecond duration $\tau_0$ (typically from 100 fs to 900 fs). A stretcher 1 having a high positive dispersion ($\beta_2^E \gg 0$), where $\beta_2^E$ represents the group velocity dispersion (GVD), allows to time stretch the light pulses so as to reduce their peak power without modifying their spectrum. The time stretching has for effect to multiply the duration of the light pulses by a factor one hundred to one thousand (or more): a pulse of initial femtosecond duration $\tau_0$ coming from the oscillator 10 has typically, at the output of the stretcher 1, a duration $\tau_1$ comprised between 100 ps and 1 ns. The time stretching of the pulses allows to avoid the generation of undesirable non-linear effects in the amplification system and the damage of the optical components. An optical amplifier 2 allows to amplify the time-stretched light pulses. The optical amplifier 2 has a gain factor G that depends on its architecture (G≈60 dB for a regenerative amplifier, G≈30-40 dB for a fiber amplifier, G≈20-30 dB pour a slab amplifier). At the output of the optical amplifier 2, the light pulses have a duration $\tau_2$. A compressor 3 arranged at the output of the amplification stage allows to time recompress the amplified pulses. The compressor 3 has a negative dispersion adapted to compensate for the positive dispersion effect of the stretcher and the amplifier: ideally, the dispersion of the compressor is equal to the opposite of the sum of the stretcher dispersion and of the amplifier dispersion. At the output of the chirped pulse amplifier system, amplified light pulses of duration $\tau_3$ ideally equal to the duration $\tau_0$ of the initial pulses, are obtained. In practice, the duration $\tau_3$ of the light pulses at the output of a chirped pulse amplifier is often higher than the duration $\tau_0$ of the initial pulses due to an effect of narrowing of the gain band by a gain factor G, as described hereinafter.

Theoretically, the duration of the output amplified pulses is limited by the spectral frequency bandwidth of the optical amplifier. Ultimately, the minimum duration $\tau$ of the light pulses that can be obtained depends on the gain bandwidth of the chosen laser material and on the gain factor. The bandwidth is defined as being the full width at half maximum (or FWHM) of the function of the energy or power gain, expressed as a function of the optical frequency ν, the optical frequency ν being equal to c/λ, where c is the speed of light and λ the wavelength. Approximately, it may be estimated that the theoretical minimum duration of the light pulses is equal to about:

$$\tau \approx \frac{1}{\Delta \nu}$$

where $\Delta \nu$ is the full width at half maximum of the spectral gain band of the amplifier material. The ultrashort pulse lasers, in particular in femtosecond regime, hence require an amplifying medium having a broad spectral gain width.

However, the minimum duration of the pulses may be limited by an effect of narrowing of the gain band. Indeed, according to the gain factor G, the minimum duration $\tau_3$ of the output light pulses may be close to the duration $\tau_0$ of the initial pulses or significantly longer than the duration $\tau_0$ of the initial pulses. In the laser amplifiers, the effect of narrowing of the gain band reduces the width of the amplification band to a significantly narrower value than the nominal bandwidth of the amplifier. This effect strongly depends on the gain factor G. A high gain factor G translates into a significant reduction of the amplified spectral gain bandwidth and leads to a longer duration of output light pulses, according to the following equation (cf. Siegman, Lasers, University Science Books, p. 359, equation (78)):

$$\tau_{out} = \tau_{in} \cdot \sqrt{1 + 4 \cdot \ln 2 \cdot G/(\pi^2 \Delta \nu^2 \cdot \tau_{in}^2)}$$

where $\tau_{out}$ and $\tau_{in}$ are the light pulse widths at the output and the input, respectively, of the amplifier.

In the case of the regenerative amplifiers of the Yb:YAG type (C. Hönninger et al., "Diode-pumped thin-disk Yb:YAG regenerative amplifier", Appl. Phys. B 65, 423-426, 1997) and Yb:KYW type (Larionov, Butze, Nickel, Giesen, High-repetition-rate regenerative thin-disk amplifier with 116 μJ pulse energy and 250 fs pulse duration, Optics Letters, Vol. 32, Issue 5, pp. 494-496, 2007), the amplification of initial pulses of sub-picosecond duration $\tau_{in}$ and having an energy of the order of 100 pJ leads to light pulses amplified up to 100 µJ (G=60 dB) whose duration $\tau_{out}$ may reach up to several picoseconds.

Different methods have been applied to overcome this limitation of the gain bandwidth and to try to reduce the duration of the amplified light pulses. In particular, certain devices use no stretcher before the amplifier and exploit the non-linear effects such as the self-phase modulation (SPM) in the amplifying medium or in a post-compression module, in combination with the group velocity dispersion, so as to compensate for the dispersion produced (see Larionov, Butze, Nickel, Giesen, High-repetition-rate regenerative thin-disk amplifier with 116 µJ pulse energy and 250 fs pulse duration, Optics Letters, Vol. 32, Issue 5, pp. 494-496, 2007; Larionov, 50 W thin-disk laser with variable pulse duration, Proc. SPIE 7912, 79120A, 2011 and W. Dietel et al., Self-Phase Modulation in a Femtosecond Pulse Amplifier with Subsequent Compression, Appl. Phys. B 46, 183-184, 1988).

Figure 2:
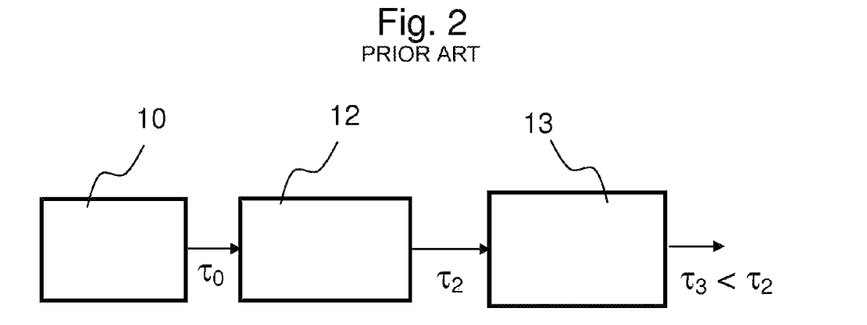
FIG. 2 schematically shows another amplification system according to the prior art.

FIG. 2 shows an example of a device of the prior art comprising an oscillator 10, an optical amplifier 12, followed by a negative-dispersion compressor 13 ($\beta_2 \ll 0$). Let's note that the device of FIG. 2 has no stretcher between the oscillator 10 and the amplifier 12. The oscillator 10 emits initial pulses of duration $\tau_0$ that are transmitted directly, without being time stretched, to the amplifier 12. The pulses propagate in the amplifier 12 and induce non-linear effects in the amplifier 12. In particular, the non-linear effect of self-phase modulation in the amplifier 12 is used to generate a non-linear phase shift and new spectral components. This device hence allows to broaden the spectral band of the amplifier 12. However, the phases of the spectral components have great variations over the transmitted spectral band. The compressor 14 induces a negative dispersion in order to place in phase the different spectral components, which allows, in certain conditions, to obtain output light pulses of duration $\tau_3$ of about 334 fs for a duration $\tau_0$ of 200 fs of the initial light pulses (Larionov, 50 W thin-disk laser with variable pulse duration, Proc. SPIE 7912, 79120A, 2011).

However, such approaches are limited in terms of minimum pulse duration and/or in terms of time quality of the thus-generated ultrashort pulses. For example, a Yb:YAG regenerative amplifier using only the self-phase modulation and having for effect the spectral broadening with a high amplification factor, generates ultrashort pulses that are either limited to a minimum duration of about 600 fs with a good time quality or of shorter duration, about 400 fs, with a significant pedestal located in a far longer drag of the order of the ps, following the main pulse (Larionov, 50 W thin-disk laser with variable pulse duration, Proc. SPIE 7912, 79120A, 2011).

Figure 3:
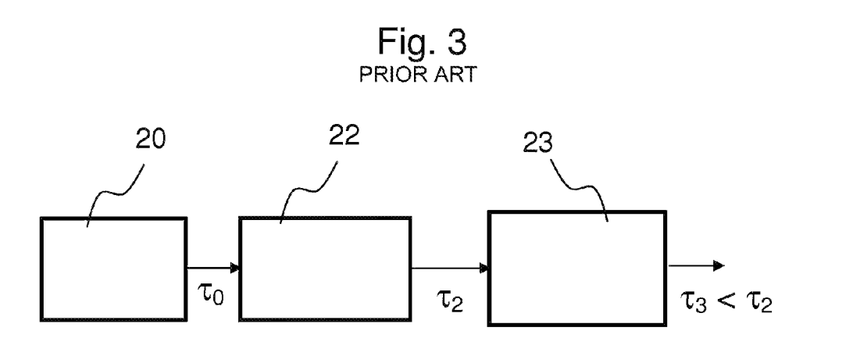
FIG. 3 schematically shows a post-compression system according to the prior art.

On the other hand, lasers exist whose light pulses are recompressed after amplification in a post-compression external module. FIG. 3 shows a post-compression scheme. An amplifier 22 generates light pulses of duration $\tau_2$ picosecond or femtosecond. The amplifier 22 is followed by a post-compressor 23, which introduces self-phase modulation and a negative group velocity dispersion ($\beta_2 < 0$). The post-compressor 23 may be made based on a single-mode fiber for low energy pulses (between 1 nJ and 500 nJ) or a hollow fiber filled with gas for high energy pulses (higher than 100 µJ). The post-compression may be applied to picosecond or femtosecond light pulses. The post-compression of the light pulses is based on a spectral broadening by self-phase modulation, followed by a negative dispersion in a suitable quantity to obtain an optimal time-compression (C. V. Shank, R. L. Fork, R. Yen, and R. H. Stolen, Appl. Phys. Lett. 40n 761, 1982; T. Damm, M. Kaschke, F. Noack, B. Wilhelmi, Opt. Lett. 10, 176, 1985; M. Nisoli, S. Stagira, S. De Silvestri, O. Svelto, S. Sartania, Z. Cheng, M. Lenzner, Ch. Spielmann, F. Krausz, Appl. Phys. B, 65, 186-196, 1997). However, in a post-compression module based on an optical fiber, the need for a single-mode coupling limits the energy of the light pulses to a relatively low level lower than one microjoule (µJ). On the other hand, a spatial degradation of post-compressed laser beam is observed, because the effect of self-phase modulation is not homogeneous through the spatial profile of the laser beam, the non-linear effects being higher at the centre of the Gaussian beam than at the edges. The drawbacks of this approach are the need for an additional post-compression external module, the additional complexity, the power losses and, in some cases, the degradation of the spatial quality of the light pulses by spatial inhomogeneities induced by the self-phase modulation.

Other methods are based on the generation of self-phase modulation in hollow fibers filled with gas (M. Nisoli et al., Appl. Phys. B, 65, 186-196, 1997) or simply the use of a non-linear medium such as a block of crystal or glass. These two approaches suffer from a significant degradation of the spatial quality of the beam during the generation of the non-linear effects. Typical power losses are of the order of 50%.

Other patent documents (US2004/0190119_A1 and EP2086074_A2) describe a linear amplifying system comprising a negative-dispersion stretcher or compensator, a positive-dispersion amplifying optical fiber in which the self-phase modulation occurs, and possibly a compressor. Such amplifying systems allow to generate amplified pulses having a duration lower than one hundred of femtoseconds. However, the energy of the amplified pulses is limited to a few nanojoules by the appearance of excessive non-linear effects in the amplifying optical fiber, in particular non-linear Raman effect. At higher energy, these non-linear effects are liable to generate a pedestal in the recompressed pulses.

The amplification of high-energy, sub-picosecond or femtosecond pulses is until now limited by the gain band of the amplifier. The use of non-linear effects to reduce the duration of the amplified pulses has generally limits in terms of power, energy and/or spatial quality of the output light pulses.

The present invention has for object to remedy these drawbacks and relates more particularly to a system for optical amplification of high-energy ultrashort light pulses of duration lower than the limitation by the bandwidth of the optical amplifier, said system comprising an oscillator able to emit ultrashort light pulses of duration $\tau_0$ lower than or equal to ten picoseconds, an optical amplifier having a spectral frequency gain bandwidth $\Delta\nu$ and a group velocity dispersion $\beta_2^{ampli}$, the optical amplifier being arranged so as to receive light pulses and to generate amplified light pulses.

According to the invention, the optical amplification system includes an optical pre-compensator arranged upstream from the optical amplifier, the pre-compensator having a negative group velocity dispersion $\beta_2$, so as to receive the ultrashort light pulses of duration $\tau_0$ and to generate negatively chirped light pulses of duration $\tau_1$ and the optical amplifier has a positive group velocity dispersion $\beta_2^{ampli}$, the optical amplifier being arranged so as to receive, amplify and time-compress the negatively chirped light pulses of duration the optical amplifier being configured so that the light pulses are able to induce a broadening of the spectral gain band $\Delta\nu$ by self-phase modulation, so as to generate amplified and time-compressed light pulses having a duration $\tau_2$ lower than or equal to the duration $\tau_1$.

Advantageously, said amplified and time-compressed light pulses have an energy higher than a few tens of microjoules and preferably higher than several hundreds of microjoules.

Advantageously, the sum of the negative group velocity dispersion $\beta_2$ of the pre-compensator and of the positive group velocity dispersion $\beta_2^{ampli}$ of the optical amplifier is lower than or equal to:

$$\beta_2 + \beta_2^{ampli} \leq 0.5 \text{ ps}^2$$

Preferentially, the sum of the negative group velocity dispersion $\beta_2$ of the pre-compensator and of the positive group velocity dispersion $\beta_2^{ampli}$ of the optical amplifier is lower than or equal to 0.1 ps$^2$.

According to various particular and advantageous aspects of the invention:
- the pre-compensator includes a negative-chirp optical fiber Bragg-grating, a prism compressor and/or a diffraction-grating compressor;
- the oscillator is a fibered oscillator or a solid-crystal oscillator.

According to a preferred embodiment of the invention, the system for optical amplification of ultrashort light pulses further includes a compressor arranged so as to receive the amplified light pulses of duration $\tau_2$, said compressor having a negative group velocity dispersion able to compensate for a positive dispersion of the amplified light pulses of duration $\tau_2$, so as to generate amplified and time-recompressed light pulses of duration $\tau_3$ lower than the duration $\tau_2$.

Advantageously, the sum of the negative group velocity dispersion of the pre-compensator, the positive group velocity dispersion of the optical amplifier and the group velocity dispersion of the compressor is lower than or equal to 0.5 ps$^2$.

Preferentially, the sum of the negative group velocity dispersion of the pre-compensator, the positive group velocity dispersion of the optical amplifier and the group velocity dispersion of the compressor is lower than or equal to 0.1 ps$^2$.

Preferably, the compressor includes at least one negative chirped pulse mirror and/or at least one diffraction grating.

According to a preferred embodiment of the invention, the optical amplifier includes a thin-disk or slab optical amplifier.

Preferentially, the optical amplifier includes a crystalline-matrix optical amplifier doped with rare earth, in particular doped with ytterbium.

Advantageously, the optical amplifier includes an optical amplifier based on Yb:YAG, Yb:KYW, Yb:KGW, Yb:CALGO, Yb:CaF$_2$, Yb:SrF$_2$, Yb:LuAG, Yb:Lu$_2$O$_3$, Yb:Sc$_2$O$_3$, Yb:Y$_2$O$_3$, Yb:YVO, Yb:YCOB, Yb:GdCOB, Yb:BOYS.

The invention also relates to a method of optical amplification of high-energy ultrashort light pulses comprising the following steps:
- generating ultrashort light pulses of duration $\tau_0$ lower than or equal to ten picoseconds, and preferably lower than five picoseconds;
- applying to the ultrashort light pulses of duration $\tau_0$ a negative group velocity dispersion before amplification, so as to generate negatively chirped light pulses of duration $\tau_1$; and
- applying an optical amplification to the negatively chirped light pulses, combined with the adding of a positive dispersion and an effect of self-phase modulation in a solid optical amplifying medium so as to induce a spectral broadening of the amplifying medium by self-phase modulation $\Delta v_{Amplifier} > \Delta v$ and to time-compress the amplified light pulses to a duration $\tau_3$ lower than the duration $\tau$ of the limitation by the bandwidth of the optical amplifier:

$$\tau_3 \langle \tau = \frac{1}{\Delta v}$$

The invention will find a particularly advantageous application in the systems for optical amplification of ultrashort light pulses.

The present invention also relates to the characteristics that will become more apparent from the following description and that will have to be considered in isolation or according to any of their technically possible combinations.

This description, which is given only by way of non-limitative example, will permit to better understand how the invention can be implemented with reference to the appended drawings, in which.

An observation belonging to the present invention is that, in the prior devices, the light pulses transmitted to the amplifier are either positively chirped (CPA approach), or non-chirped (SPM approach). The light pulses then see in the amplifier an additional positive chirp and the duration of the pulses is hence slightly lengthened or remains approximately constant.

Figure 4:
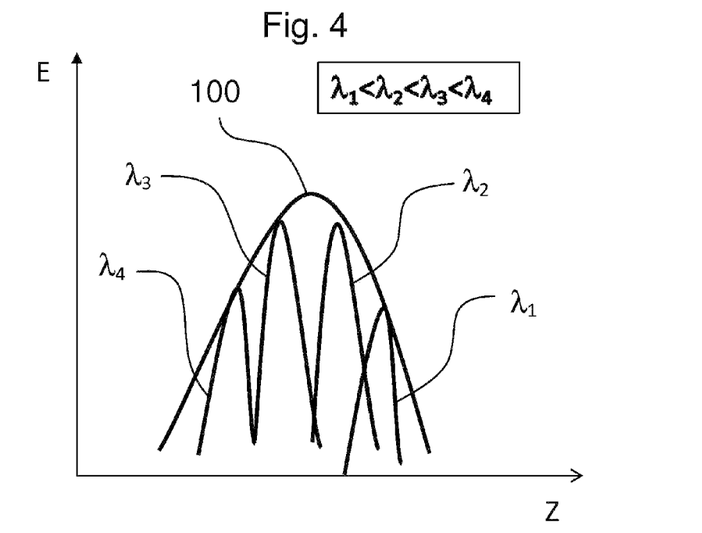
FIG. 4 schematically shows the propagation of a negatively chirped light pulse.

It is proposed to apply a negative dispersion to the initial pulses before their amplification. FIG. 4 schematically shows the energy E of an ultrashort pulse as a function of an axis Z of spatial propagation. The ultrashort pulse 100 includes spectral components at the wavelengths $\lambda_1, \lambda_2, \lambda_3$ and $\lambda_4$ such that $\lambda_1 < \lambda_2 < \lambda_3 < \lambda_4$. FIG. 4 illustrates the effect of a negative dispersion on the propagation of the ultrashort pulse 100: the shortest (or most energetic) wavelengths $\lambda_1$ then $\lambda_2$ are in time advance relative to the longer (or less energetic) wavelengths $\lambda_3$ then $\lambda_4$.

The quantity of negative dispersion of the pre-compressor is correctly sized as a function of the positive dispersion met by the pulses during the amplification process in the downstream optical amplifier. The best results are obtained when the value of the negative dispersion applied to the initial pulses before amplification is approximately equivalent to the value of the positive dispersion cumulated in the amplifier. It is hence obtained a compensation for the dispersion towards the end of the amplification process. This allows to obtain an efficient pulse compression inside the amplifier. Then, the self-phase modulation generates efficiently a spectral broadening so that the amplified pulses may be recompressed with a good time quality. This compression (or the compensation of the non-linear phase shift produced) may be performed easily by several reflections on highly-reflective negative-dispersion mirrors or by a moderately-dispersive diffraction-grating compressor of high-efficiency, or by a compressor based on a pair of prisms. Preferentially, the compressor is located outside the amplifying cavity.

Figure 5:
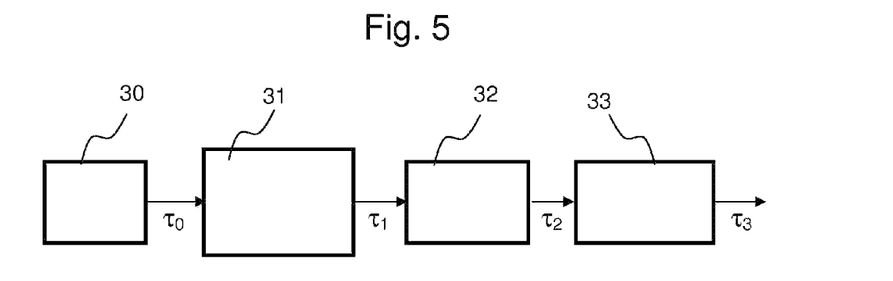
FIG. 5 schematically shows the principle of a light-pulse amplification system according to the invention.

FIG. 5 schematically illustrates the principle of the invention. An oscillator 30 generates fs or ps light pulses. Advantageously, a fiber oscillator is used, which generates pulses of ps duration $\tau_0$ (chirped) or of fs duration $\tau_0$. A pre-compensator 31 is arranged between the oscillator 30 and the amplifier 32, which is optionally followed by a compressor 33. The pre-compensator 31 has a negative dispersion ($\beta_2 < 0$) so as to add a negative chirp to the light pulses coming from the oscillator 30 without inducing a spectral modification of these light pulses. The pre-compensator 31 generates a negative chirp before the injection of the light pulses in the optical amplifier 32. As the optical amplifier 32 has a positive dispersion $\beta_2^{ampli}$ in the wavelength range of use, around 1 µm, the light pulse is then compressed during the amplification, like a "soliton" pulse.

Advantageously, a chirped Bragg-grating (C-FBG) pre-compensator 31 is used, which has a negative group velocity dispersion $\beta_2$, for example of about $-0.55$ ps$^2$. The value of this negative dispersion is preferably chosen so that the negative chirp after the pre-compensator is equivalent in absolute value to the positive dispersion induced by the amplifier 32:

$$\beta_2 \approx -|\beta_2^{ampli}|$$

As an alternative, it is also possible to use a crystal oscillator that generates directly negatively chirped pulses. In this case, the oscillator and the pre-compensator form a single integrated component upstream from the amplifier.

In the case where the oscillator generates pulses with no chirp, the pre-compensator 31 induces a negative chirp, the pulses at the input of the amplifier are negatively chirped and time stretched: $\tau_1 > \tau_0$. In the case where the oscillator generates pulses with a positive chirp, this positive chirp has to be taken into account for the dimensioning of the negative dispersion value introduced by the pre-compensator 31. As a function of the value of the positive dispersion to be compensated in the amplifier, the duration of the negatively chirped pulses before the amplifier, $\tau_1$, may be lower than, equal to or higher than the initial duration of the positively chirped oscillator ($\tau_0$).

In the optical amplifier 32, a negatively chirped light pulse is both amplified and time-compressed by the positive dispersion of the amplifier: $\beta_2^{ampli}$. This positive dispersion is essentially defined by the active amplifier medium (laser crystal or slab or thin disk) or by other components of the amplifier that are used in transmission (for ex. a Pockels cell in a regenerative cavity). In the same time, the light pulse undergoes self-phase modulation (SPM) during the amplification process. This SPM effect is dominant at the end of the amplification process, where the intensity of the light pulses is the highest. The spectral width of a light pulse at the output of the amplifier 32 is broadened by the self-phase modulation effect. The light pulse exits from the amplifier 32 with a duration $\tau_2$ that is substantially lower than or equal to the duration $\tau_1$ of the injected light pulses. The compressor 33 has a negative dispersion and allows to further reduce the light pulse duration $\tau_3 \leq \tau_1, \tau_2$ while keeping good time quality and spatial quality. Advantageously, a dispersive-mirror compressor 33 is used, which has a negative dispersion $\beta_2 \leq 0$.

Advantageously, the optical amplifier 32 includes a solid amplifying medium. Preferably, a thin-disk amplifier is used, which allows to spatially distribute the light pulse over a diameter comprised between 100 µm and several mm.

Compared to a "conventional post-compression", such as shown in relation with FIG. 3, the system of FIG. 5 has the advantage to produce a self-phase modulation in the solid optical amplifier 32, which ensures in the same time an homogenisation of this effect through the spatial profile of the beam and hence does not degrade the spatial quality of the laser beam. The self-phase modulation occurs when a short pulse with an intensity I propagates in a Kerr medium having a non-linear refractive index. A laser crystal and/or a Pockels cell may constitute this Kerr medium, which can hence introduce self-phase modulation.

Figure 6:
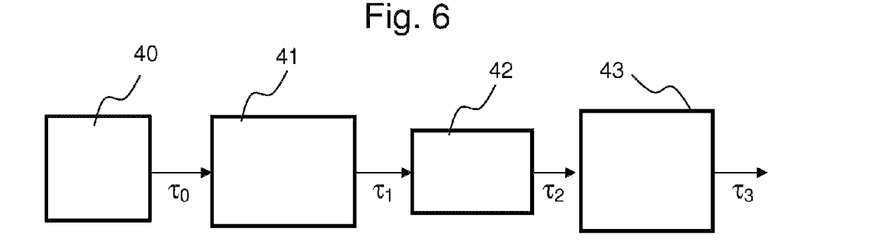
FIG. 6 schematically shows a light-pulse amplification system according to one embodiment of the invention.

More precisely, in certain embodiments, the amplifying medium itself, by its non-linear refractive index, produces self-phase modulation by Kerr effect. This is the case when the amplifying medium is used along a longitudinal axis, for example in slab geometry or in thick crystal geometry. In other embodiments, in particular for a thin-disk amplifier, the contribution of the amplifying medium to the self-phase modulation is low. In this case, the self-phase modulation may occur in an optical component that is separated from the amplifying medium, for example in a Pockels cell comprising a non-linear medium having a Kerr index. FIG. 6 shows a light-pulse amplification system according to an embodiment of the invention. A so-called "front-end injection" system includes a monolithic component 40 including a slightly positively chirped fiber optic oscillator, a pre-compensator 41 formed by a Bragg grating inscribed in an optical fiber, the Bragg grating being negatively chirped. The pre-compensator 41 is followed by an amplifier 42, itself followed by a compressor 43. The negative chirp of the light pulses before amplification is dimensioned as a function of desired output parameters and of the amplifier. More precisely, it is tried to compensate for the negative pre-chirp by the positive dispersion in the amplifier. The fine adjustment may be made, for example, by controlling the number of passages in the regenerative amplifier. The measurement may be performed via the spectral width produced in the amplifier or by minimizing the duration of the pulses after the compressor. The amplifier 42 is preferably a regenerative amplifier with a Yb:YAG or Yb:KYW gain medium (of crystal bar geometry, thin disk geometry used in the thin direction, or slab geometry along one of the long axes) but can also be another Yb-doped crystal matrix. Advantageously, a dispersive-mirror compressor 43 is used, for example of the dielectric multilayer type, having a dispersion $\beta_2 \leq 0$ so that the duration $\tau_3$ of the pulses at the output of the system is lower than or equal to the duration $\tau_0$ of the initial pulses and to the duration $\tau_1$ of the negatively chirped pulses.

Figure 7:
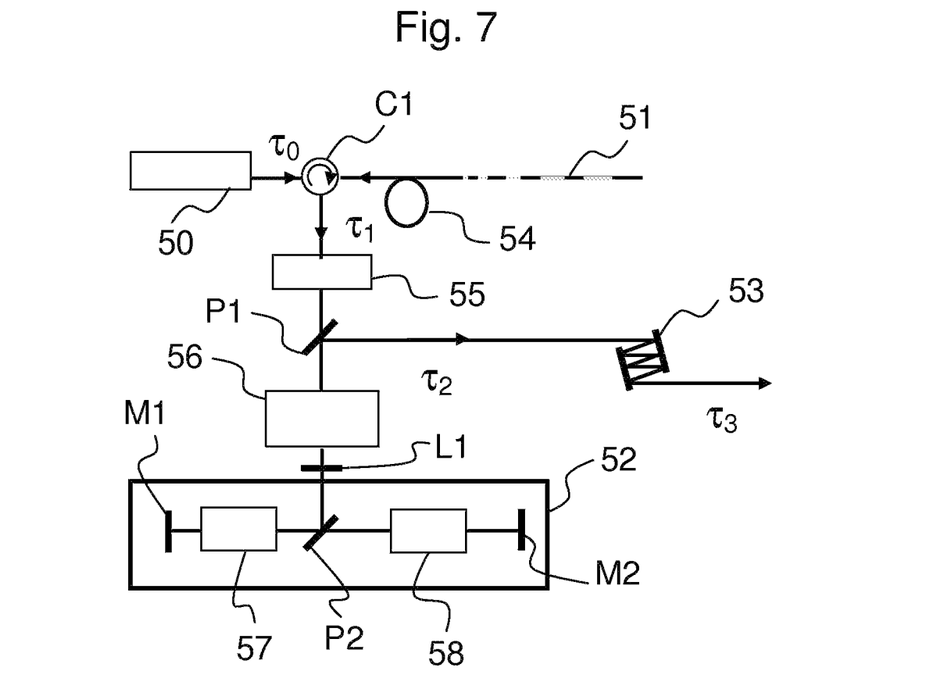
FIG. 7 schematically shows a light-pulse amplification system according to the preferred embodiment of the invention.

FIG. 7 schematically shows a light-pulse amplification system according to a preferred embodiment of the invention. The device of FIG. 7 includes an oscillator 50, an optical circulator C1, a negative-dispersion pre-compensator 51, a pre-amplifier 54, a collimator 55, a polariser P1, a Faraday rotator 56, a half-wave plate L1, a regenerative amplifier 52 and a compressor 53. Advantageously, the regenerative amplifier 52 includes a Pockels cell 57, a gain amplifying medium 58, mirrors M1, M2, and a polariser P2. The oscillator 50 is preferably an optical fiber oscillator but can also be a laser-crystal "soliton" oscillator, with a free-space laser cavity. The oscillator 50 delivers light pulses of duration $\tau_0$ equal to about 3 ps, these light pulses being positively chirped by about +0.27 ps$^2$.

It is to be noted, as well known by the one skilled in the art, that the dispersion is expressed with an opposite sign according to whether it is expressed in ps$^2$ (dispersion expressed as a function of the optical frequency) or in ps/nm (dispersion expressed as a function of the wavelength), respectively.

The circulator C1 directs the initial pulses towards the pre-compensator 51 formed by a negatively-chirped optical-fiber Bragg grating, having for example a dispersion $\beta_2$ equal to about –0.55 ps$^2$. The light pulses before amplification have a duration $\tau_1$ of about 10 ps, and a negative chirp of about –0.27 ps$^2$. The reflectivity of the Bragg grating 51 is preferably high. Optionally, for example if the reflectivity of the Bragg grating 51 is low, a low-gain pre-amplifier 54 may be arranged between the circulator C1 and the Bragg grating 51. The circulator C1 directs the negatively chirped light pulses of duration $\tau_1$ on the third port of the circulator C1 towards the collimator 55. The polariser P1 polarises linearly the pulses at the input of the regenerative amplifier 52. The Faraday rotator 56, the half-wave plate and the Pockels cell allow to inject a light pulse in the cavity of the regenerative amplifier 52. The Pockels cell 57 and the gain amplifying medium 58 each have a positive dispersion. Advantageously, the gain medium is Yb:YAG. The positive dispersion cumulated in the regenerative amplifier 52 is of about 0.27 ps$^2$. The duration $\tau_2$ of pulses at the output of the regenerative amplifier 52 is of about 1 ps (mainly due to the narrowing of the gain width). The spectral gain bandwidth after the regenerative amplifier 52 is of about 5 to 6 nm. The spectral gain band is broadened by the self-phase modulation essentially cumulated in the last passages in the regenerative amplifier 52. The compressor 53 is a dispersive-mirror compressor and has a negative dispersion of the order of –0.03 ps$^2$ to –0.05 ps$^2$ (chirped mirrors). The compressor 53 typically provides a dispersion $\beta_2$ of only some –0.01 ps$^2$ and can hence consist in simple dispersive mirrors with a few reflections. As an alternative, the compressor 53 can be based on one or several diffraction gratings. At the output, the duration $\tau_3$ of the light pulses is reduced to about 360 fs for the Yb-YAG amplifier (cf. FIG. 9). For the Yb:KYW amplifier, pulses having a duration of the order of 150 fs or event 100 fs can be obtained (cf. FIG. 10A-10B).

Figure 8:
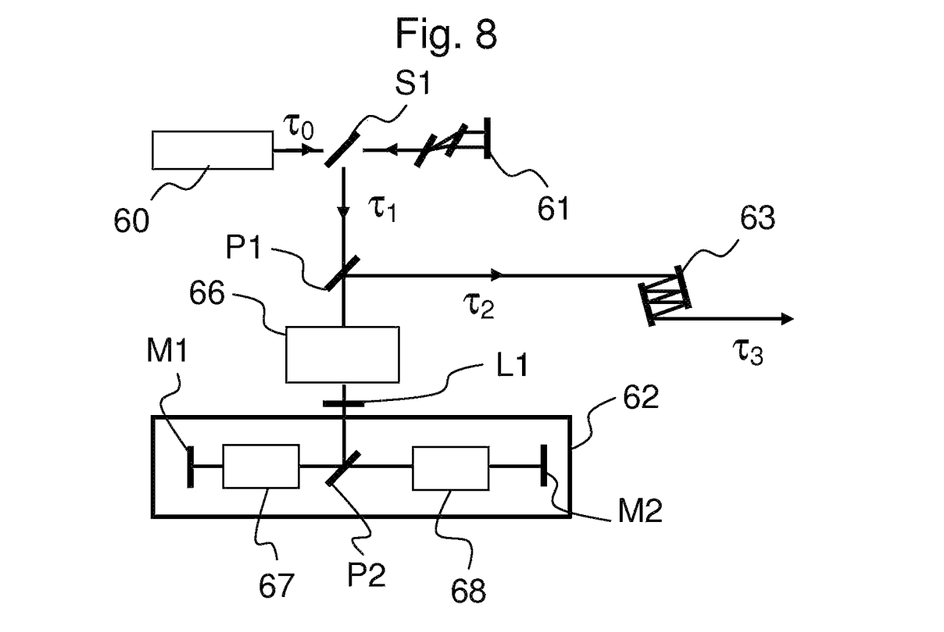
FIG. 8 schematically shows an amplification system according to a variant of the embodiment of FIG. 7.

FIG. 8 schematically shows an amplification system according to a variant of the embodiment of FIG. 7. The device of FIG. 8 includes an oscillator 60, a separator S1, a negative-dispersion pre-compensator 61, a polariser P1, a Faraday rotator 66, a half-wave plate L1, a regenerative amplifier 62 and a compressor 63. The regenerative amplifier 62 includes a Pockels cell 67, a gain amplifying medium 68, mirrors M1, M2, and a polariser P2. Advantageously, the oscillator 60 provides light pulses of duration $\tau_0$ equal to about 200 fs without dispersion. The pre-compensator 61 is consisted by a pair of diffraction gratings and has a negative dispersion $\beta_2$ equal to about –0.27 ps$^2$. The positive dispersion cumulated in the regenerative amplifier 62 is of about +0.27 ps$^2$. The compressor 63 is a dispersive-mirror compressor and has a negative dispersion comprised between –0.03 and –0.05 ps$^2$ (chirped mirrors). The operation of the device of FIG. 8 is moreover similar to that described in relation with FIG. 7.

Advantageously, the whole dispersion (sum of the dispersion of the oscillator of the pre-compensator, of the amplifier and of the compressor) is generally negative, because the negative dispersion of the compressor essentially serves to compensate for the self-phase modulation and not to compensate for the positive dispersion of a component upstream from the compressor.

We have validated the pre-compensation approach by adding of a negative dispersion before amplification and measured the characteristics of the light pulses at the output of a device as shown in FIG. 7.

Figure 9:
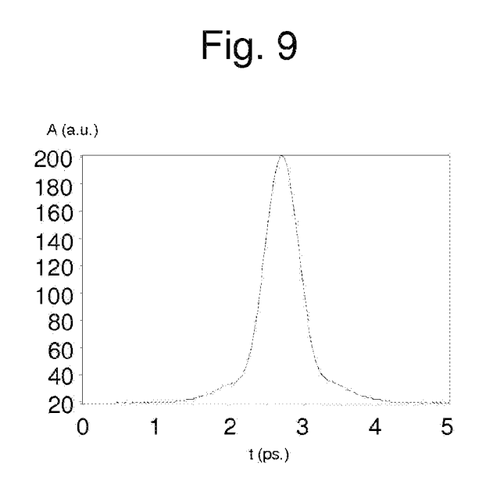
FIG. 9 shows a measurement of pulse auto-correlation at the output of a regenerative amplifying system according to the preferred embodiment of the invention, based on a thin-disk Yb:YAG amplifier, for a pulse of 200 µJ and having a duration of about 360 fs.

FIG. 9 shows a pulse auto-correlation plot (measurement curve) at the output of a regenerative amplifying system according to the embodiment of FIG. 7 and based on a Yb:YAG thin-disk amplifier. The abscissa axis represents the time in picoseconds and the ordinate axis the auto-correlation amplitude in arbitrary units (a.u.). The duration $\tau_3$ of the light pulses at the output of the Yb:YAG amplification system is of the order of 350 fs.

Figure 10A:
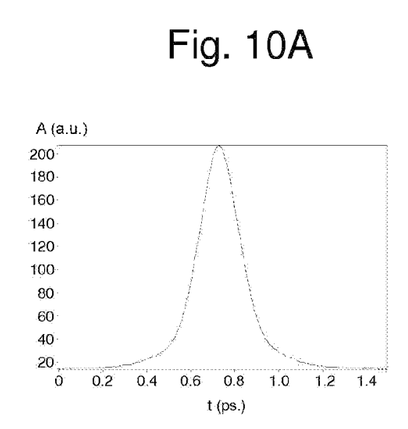
FIGS. 10A and 10B show measurements of pulse auto-correlation at the output of a Yb:KYW amplifying system according to the preferred embodiment of the invention, for a level of energy of 40 µJ (FIG. 10A) and of 70 µJ (FIG. 10B), respectively.
Figure 10B:
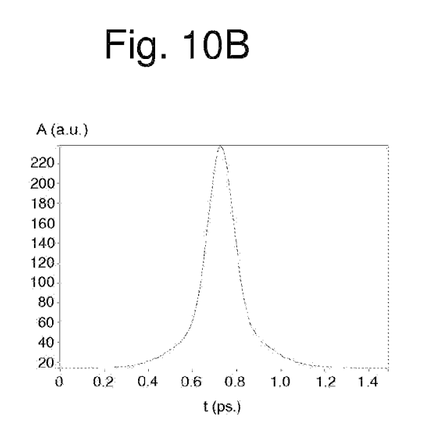

FIGS. 10A and 10B show pulse auto-correlation plots (measurement curve) at the output of a Yb:KYW amplifying system according to the embodiment of FIG. 7 and for a level of energy of 40 µJ (FIG. 10A) and 70 µJ (FIG. 10B), respectively. The Yb:KYW amplifying medium has a gain bandwidth higher than that of Yb:YAG. As a consequence, far shorter pulses may be obtained with a Yb:KYW laser. The difference between the two plots is the level of energy (about 40 µJ for FIG. 10A and about 70 µJ for FIG. 10B), which corresponds to different degrees of self-phase modulation cumulated during the amplification. The duration $\tau_3$ of the light pulses at the output of the amplification system based on Yb:KYW is of the order of 150 fs in FIG. 10A and about 110 fs in FIG. 10B, respectively.

Light pulses having an energy of several tens to hundreds of µJ are extracted from a Yb:YAG thin-disk regenerative amplifier and from a Yb:KYW regenerative amplifier. The duration $\tau_3$ of the light pulses at the output of the amplification system is, in a first exemplary embodiment, of less than 300 fs to 350 fs for the Yb:YAG and for an energy of the output light pulses of the order of 200 to 300 µJ, and, in another exemplary embodiment, of the order of 100 to 110 fs for the Yb:KYW and for an energy of the output light pulses of the order of 40 to 70 µJ. These results represent by far the shortest pulses produced by this type of amplifiers at these levels of energy. Indeed, the limitation by the gain bandwidth for the Yb:YAG material is typically about 600 fs at low gain and above 1 ps for a high laser gain amplifier (low gain: cf. P. Russbueldt et al., 400 W Yb:YAG Innoslab fs-amplifier, Optics Express, 17, 12230-12245, 2009; high gain: cf. C. Hönninger et al. or Larionov et al., mentioned hereinabove). The residual negative dispersion needed for the pulse compression after the amplifier is of the order of a few tens of thousands of fs$^2$. Advantageously, a weakly dispersive diffraction-grating compressor is used. However, the low value of the residual dispersion to be compressed allows to use a simpler configuration based on a compressor formed of highly-reflective negative-dispersion mirrors.

According to the preferred embodiment, the amplifier is a regenerative amplifier. However, the same principle may be applied to other types of laser amplifiers, as for example the linear (slab) amplifiers taking into account their specificities and their respective limits.

The device and the method of the invention allow to obtain pulses of shorter duration (about 300 fs for Yb:YAG, about 100 fs for Yb:KYW, for example) than the bandwidth limit of the amplifier. The spatial quality of the light pulse beam is not affected.

The invention allows to overcome several of the limits of the prior optical amplifying systems and opens up the way to the generation of high-energy femtosecond pulses beyond the limit of the gain band. The proposed approach guarantees a high efficiency, requires no additional external module, and allows to maintain an excellent beam quality. The device may be made using small and compact optical components, in particular integrated on an optical fiber upstream from the amplifier. The principle of the invention may also be applied to lower-power lasers.

The invention allows to manufacture a femtosecond amplifier operating beyond the limit of the spectral gain band. The successive compensation in the compressor for the positive dispersion cumulated essentially at the end of the amplification cycle in the amplifier allows to generate pulses of duration $\tau_3$ lower than the duration $\tau=1/\Delta\nu$ of the limitation by the bandwidth of the optical amplifier. The device is simple and does not necessarily require an external post-compression module with a complex fiber coupling.

The invention claimed is:

1. A system for optical amplification of high-energy ultrashort light pulses of duration lower than the limitation by the bandwidth of the optical amplifier, said system comprising:
   an oscillator (30, 40, 50, 60) adapted to emit ultrashort light pulses of duration $\tau_0$ lower than or equal to ten picoseconds,
   an optical amplifier (32, 42, 52, 62) having a spectral frequency gain bandwidth $\Delta\nu$ and a group velocity dispersion $\beta_2^{ampli}$, the optical amplifier (32, 42, 52, 62) being arranged so as to receive light pulses and to generate amplified light pulses,
   characterized in that the optical amplification system includes:
   an optical pre-compensator (31, 41, 51, 61) arranged upstream from the optical amplifier (32, 42, 52, 62), the pre-compensator (31, 41, 51, 61) having a negative group velocity dispersion $\beta_2$, so as to receive the ultrashort light pulses of duration $\tau_0$ and to generate negatively chirped light pulses of duration $\tau_1$;
   and in that:
   the optical amplifier (32, 42, 52, 62) has a positive group velocity dispersion $\beta_2^{ampli}$, the optical amplifier (32, 42, 52, 62) being arranged so as to receive, amplify and time-compress the negatively chirped light pulses of duration $\tau_1$, the optical amplifier being configured so that the light pulses are able to induce a broadening of the spectral gain band $\Delta\nu$ by self-phase modulation, so as to generate amplified and time-compressed light pulses having a duration $\tau_2$ lower than or equal to the duration $\tau_1$, and wherein the sum of the negative group velocity dispersion $\beta_2$ of the pre-compensator (31, 41, 51, 61) and of the positive group velocity dispersion $\beta_2^{ampli}$ of the optical amplifier (32, 42, 52, 62) is lower than or equal to:

$\beta_2+\beta_2^{ampli}\leq 0.5$ ps$^2$.

2. The system for optical amplification of ultrashort light pulses according to claim 1, wherein the pre-compensator (31, 41, 51, 61) includes a negative-chirp optical fiber Bragg-grating (51), a prism compressor and/or a diffraction-grating compressor (61).

3. The system for optical amplification of ultrashort light pulses according to claim 2, wherein the oscillator (30, 40, 50, 60) is a fiber oscillator or a solid-crystal oscillator.

4. The system for optical amplification of ultrashort light pulses according to claim 1, further comprising a compressor (33, 43, 53, 63) arranged so as to receive the amplified light pulses of duration $\tau_2$, said compressor having a negative group velocity dispersion adapted to compensate for a positive dispersion of the amplified light pulses of duration $\tau_2$, so as to generate amplified and time-recompressed light pulses of duration $\tau_3$ lower than the duration $\tau_2$.

5. The system for optical amplification of ultrashort light pulses according to claim 4, wherein the sum of the negative group velocity dispersion of the pre-compensator (31, 41, 51, 61), the positive group velocity dispersion of the optical amplifier (32, 42, 52, 62) and the group velocity dispersion of the compressor (33, 43, 53, 63) is lower than or equal to 0.5 ps$^2$.

6. The system for optical amplification of ultrashort light pulses according to claim 4, wherein the compressor (33, 43, 53, 63) includes at least one negatively chirped mirror and/or at least one diffraction grating.

7. The system for optical amplification of ultrashort light pulses according to claim 1, wherein the optical amplifier (32, 42, 52, 62) includes a thin-disk or slab optical amplifier.

8. The system for optical amplification of ultrashort light pulses according to claim 1, wherein the optical amplifier (32, 42, 52, 62) includes a crystal-matrix optical amplifier doped with rare earth, in particular doped with ytterbium.

9. A method of optical amplification of high-energy ultrashort light pulses comprising the following steps:
   generating ultrashort light pulses of duration $\tau_0$ lower than or equal to ten picoseconds;
   applying to the ultrashort light pulses of duration $\tau_0$ a negative group velocity dispersion before amplification, so as to generate negatively chirped light pulses of duration $\tau_1$; and
   applying an optical amplification to the negatively chirped light pulses, combined with the adding of a positive dispersion and an effect of self-phase modulation in a solid optical amplifying medium such that the sum of the negative group velocity dispersion applied before amplification and of the positive group velocity dispersion applied by said optical amplification is lower than or equal to 0.5 ps$^2$, so as to induce a spectral broadening of the amplifying medium by self-phase modulation $\Delta\nu_{Amplifier}>\Delta\nu$ and to time-compress the amplified light pulses to a duration $\tau_3$ lower than the duration $\tau$ of the limitation by the bandwidth of the optical amplifier:

$$\tau_3\langle\tau=\frac{1}{\Delta\nu}.$$

10. The system for optical amplification of ultrashort light pulses according to claim 1, wherein the pre-compensator (31, 41, 51, 61) includes a negative-chirp optical fiber Bragg-grating (51), a prism compressor and/or a diffraction-grating compressor (61).

11. The system for optical amplification of ultrashort light pulses according to claim 10, wherein the oscillator (30, 40, 50, 60) is a fiber oscillator or a solid-crystal oscillator.

12. The system for optical amplification of ultrashort light pulses according to claim 5, wherein the compressor (33, 43, 53, 63) includes at least one negatively chirped mirror and/or at least one diffraction grating.

* * * * *